(12) United States Patent
Chen et al.

(10) Patent No.: US 10,554,445 B2
(45) Date of Patent: Feb. 4, 2020

(54) DATA PACKET SENDING METHOD AND APPARATUS

(71) Applicant: Huawei Technologies Co., Ltd., Shenzhen (CN)

(72) Inventors: Zhongping Chen, Shanghai (CN); Gangjie He, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 49 days.

(21) Appl. No.: 16/023,742

(22) Filed: Jun. 29, 2018

(65) Prior Publication Data
US 2018/0316522 A1 Nov. 1, 2018

Related U.S. Application Data

(63) Continuation of application No. PCT/CN2015/100253, filed on Dec. 31, 2015.

(51) Int. Cl.
*H04L 12/28* (2006.01)
*H04L 12/46* (2006.01)
(Continued)

(52) U.S. Cl.
CPC .......... *H04L 12/4633* (2013.01); *H04L 12/66* (2013.01); *H04L 41/0803* (2013.01);
(Continued)

(58) Field of Classification Search
CPC ...................................................... H04L 12/28
(Continued)

(56) References Cited

U.S. PATENT DOCUMENTS

2003/0153309 A1 8/2003 Bjelland et al.
2012/0008561 A1 1/2012 Wang et al.
(Continued)

FOREIGN PATENT DOCUMENTS

CN 1710967 A 12/2005
CN 101541097 A 9/2009
(Continued)

OTHER PUBLICATIONS

3rd Generation Partnership Project; Technical Specification Group Core Network and Terminals; Study of Evolved Packet Core (EPC) nodes restoration (Release 11), 3GPP TR 23.857 V11.0.0 (Dec. 2012), 66 pages.
(Continued)

*Primary Examiner* — Dang T Ton
(74) *Attorney, Agent, or Firm* — Slater Matsil, LLP

(57) ABSTRACT

Embodiments of the present disclosure provide a data packet sending method and apparatus, and relate to communications field. The method includes: receiving, by an SGW-U, a data packet, and matching context information of a corresponding bearer according to a tunnel endpoint identifier (TEID) carried in the data packet; sending a trigger message to a serving gateway for control plane SGW-C if the SGW-U determines, through matching, that the SGW-U does not include the context information of the bearer, where the trigger message carries the TEID, and the trigger message is used by the SGW-C to obtain the context information of the bearer according to the TEID; receiving a reestablish bearer context message sent by the SGW-C, where the reestablish bearer context message carries the context information of the bearer; and sending the data packet according to the context information of the bearer.

15 Claims, 7 Drawing Sheets

(51) Int. Cl.
*H04W 76/10* (2018.01)
*H04L 12/66* (2006.01)
*H04L 12/24* (2006.01)
*H04L 29/12* (2006.01)
*H04L 29/06* (2006.01)
*H04W 76/19* (2018.01)
*H04W 8/30* (2009.01)

(52) U.S. Cl.
CPC .............. *H04L 61/20* (2013.01); *H04L 69/22* (2013.01); *H04W 76/10* (2018.02); *H04W 76/19* (2018.02); *H04L 2212/00* (2013.01); *H04W 8/30* (2013.01)

(58) Field of Classification Search
USPC ........................................................ 370/329
See application file for complete search history.

(56) References Cited

U.S. PATENT DOCUMENTS

| | | |
|---|---|---|
| 2012/0094629 A1 | 4/2012 | Liu et al. |
| 2012/0157132 A1 | 6/2012 | Olsson et al. |
| 2013/0212212 A1 | 8/2013 | Addepalli et al. |
| 2014/0153572 A1 | 6/2014 | Hampel et al. |
| 2015/0110121 A1 | 4/2015 | Tan et al. |
| 2015/0124585 A1 | 5/2015 | Sahin et al. |
| 2017/0070923 A1* | 3/2017 | Li .................... H04W 36/0066 |

FOREIGN PATENT DOCUMENTS

| | | |
|---|---|---|
| CN | 101932026 A | 12/2010 |
| CN | 103636284 A | 3/2014 |
| CN | 104813618 A | 7/2015 |
| JP | 2015521818 A | 7/2015 |
| RU | 2011141861 A | 4/2013 |
| WO | 2011127861 A2 | 10/2011 |
| WO | 2015003972 A1 | 1/2015 |

OTHER PUBLICATIONS

3rd Generation Partnership Project; Technical Specification Group Core Network and Terminals; Restoration procedures (Release 13), 3GPP TS 23.007 V13.3.0 (Dec. 2015), 6 pages.

3rd Generation Partnership Project; Technical Specification Group Core Network and Terminals; Study of Evolved Packet Core (EPC) nodes restoration (Release 11), 3GPP TR 23.857 V11.0.0 (Dec. 2012), 7 pages.

* cited by examiner

DATA PACKET SENDING METHOD AND APPARATUS

CROSS-REFERENCE TO RELATED APPLICATIONS

This application is a continuation of International Application No. PCT/CN2015/100253, filed on Dec. 31, 2015, the disclosure of which is hereby incorporated by reference in its entirety.

TECHNICAL FIELD

The present disclosure relates to the communications field, and in particular, to a data packet sending method and apparatus.

BACKGROUND

As network architectures evolve, a distributed gateway (DGW) architecture is an enhanced network architecture proposed based on an existing evolved packet system (EPS) network architecture according to an idea of control/user (C/U) separation of network functions. C/U separation means that a control plane function of a gateway is decoupled from a user plane function of the gateway. A serving gateway (SGW) is logically divided into two independent logical network elements: a serving gateway for control plane (SGW-C) and a serving gateway for user plane (SGW-U). The SGW-C is a signaling control anchor of a neighboring network element, and is responsible for processing signaling of the neighboring network element. The SGW-U is a processing anchor of a user data packet, and is responsible for receiving a user data packet and sending a user data packet.

Currently, when the SGW-U receives a data packet, where a header of the data packet carries a tunnel endpoint identifier (TEID) that is of a bearer and that is on an SGW-U side, and the bearer is a bearer that is used to transmit the data packet, the SGW-U obtains, according to the TEID, context information of the bearer from bearer context information stored on the SGW-U, and sends the data packet according to the context information.

During implementation of the present disclosure, the inventor finds that the current system has at least the following problems.

Currently, the SGW-U sometimes loses context information, and when the context information is not obtained due to a loss of the context information corresponding to the TEID, a user data service is interrupted, affecting user experience.

SUMMARY

To prevent user service interruption and improve user experience, embodiments of the present disclosure provide a data packet sending method and apparatus. The technical solutions are as follows.

According to a first aspect, a data packet sending method is provided. The method includes: receiving, by a serving gateway for user plane (SGW-U), a data packet, and matching context information of a corresponding bearer according to a tunnel endpoint identifier (TEID) carried in the data packet. The method also includes sending a trigger message to a serving gateway for control plane SGW-C if the SGW-U determines, through matching, that the SGW-U does not include the context information of the bearer corresponding to the TEID, where the trigger message carries the TEID, and the trigger message is used by the SGW-C to obtain the context information of the bearer according to the TEID. The method also includes receiving a reestablish bearer context message sent by the SGW-C, where the reestablish bearer context message carries the context information of the bearer; and sending the data packet according to the context information of the bearer.

In the first aspect, when determining, through matching, that the SGW-U does not include the context information of the bearer corresponding to the TEID, the SGW-U sends the trigger message to the SGW-C, to request to obtain the context information of the bearer, so that the SGW-U can send the data packet according to the obtained context information. This prevents user service interruption and improves user experience.

Optionally, with reference to the first aspect, in a first possible implementation of the first aspect, the method further includes: receiving a modify bearer request message sent by the SGW-C, where the modify bearer request message carries a bearer identifier; sending a modify bearer response message to the SGW-C if the SGW-U does not include the context information of the bearer corresponding to the bearer identifier, where the modify bearer response message carries the bearer identifier and indication information that is used to indicate that the SGW-U does not include the context information, and the modify bearer response message is used by the SGW-C to obtain the context information of the bearer according to the bearer identifier; and receiving the reestablish bearer context message sent by the SGW-C, where the reestablish bearer context message carries the context information of the bearer.

In the first possible implementation of the first aspect, in a service request procedure, if the SGW-U does not include the context information of the bearer corresponding to the bearer identifier carried in the modify bearer request message, the SGW-U sends a message to the SGW-C to request to recover the context information in the SGW-U. This ensures that a data packet can be sent according to the context information when the data packet is received, and prevents user service interruption.

According to a second aspect, a data packet sending method is provided. The method includes: receiving, by a serving gateway for control plane SGW-C, a trigger message sent by a serving gateway for user plane SGW-U. The trigger message carries a tunnel endpoint identifier (TEID). The trigger message is sent after the SGW-U receives a data packet carrying the TEID and determines, through matching, that the SGW-U does not include context information of a bearer corresponding to the TEID. The method also includes obtaining the context information of the bearer according to the TEID. The method also includes sending a reestablish bearer context message to the SGW-U, where the reestablish bearer context message carries the context information, and the reestablish bearer context message is used by the SGW-U to send the data packet according to the context information.

In the second aspect, the SGW-C sends the context information of the bearer to the SGW-U when the SGW-U determines, through matching, that the SGW-U does not include the context information of the bearer corresponding to the TEID, so that the SGW-U can send the data packet according to the context information. This prevents user service interruption and improves user experience.

With reference to the second aspect, in a first possible implementation of the second aspect, the obtaining the context information of the bearer according to the TEID includes: starting timing when the trigger message is received, and if a modify bearer request message sent by a mobility management entity MME is received before a timing time reaches a preset time, and the modify bearer request message carries a TEID that is of a first tunnel between a base station and the SGW-U and that is on a base station side and carries an address of the base station, updating the TEID on the base station side and the address of the base station to the context information that is of the bearer corresponding to the TEID and that is stored on the SGW-C; and obtaining the updated context information of the bearer from stored context information according to the TEID.

In the first possible implementation of the second aspect, in a service request procedure, the SGW-C sends the context information to the SGW-U if the SGW-U does not include the context information of the bearer corresponding to a bearer identifier carried in the modify bearer request message. This ensures that the SGW-U can send a data packet according to the context information when receiving the data packet, and prevents user service interruption.

With reference to the first possible implementation of the second aspect, in a second possible implementation of the second aspect, the obtaining the context information of the bearer according to the TEID further includes: if the modify bearer request message sent by the MME is not received when the timing time reaches the preset time, obtaining the context information of the bearer from the stored context information according to the TEID.

According to a third aspect, a data packet sending apparatus is provided. The apparatus includes: a receiving unit, configured to: receive a data packet, and match context information of a corresponding bearer according to a tunnel endpoint identifier (TEID) carried in the data packet. The apparatus also includes a sending unit, configured to send a trigger message to a serving gateway for control plane (SGW-C) if the apparatus determines, through matching, that the apparatus does not include the context information of the bearer. The trigger message carries the TEID. The trigger message is used by the SGW-C to obtain the context information of the bearer according to the TEID. The receiving unit is further configured to receive a reestablish bearer context message sent by the SGW-C. The reestablish bearer context message carries the context information of the bearer. The sending unit is further configured to send the data packet according to the context information of the bearer.

In the third aspect, when determining, through matching, that the SGW-U does not include the context information of the bearer corresponding to the TEID, the SGW-U sends the trigger message to the SGW-C, to request to obtain the context information of the bearer, so that the SGW-U can send the data packet according to the obtained context information. This prevents user service interruption and improves user experience.

With reference to the third aspect, in a first possible implementation of the third aspect, the receiving unit is further configured to receive a modify bearer request message sent by the SGW-C, where the modify bearer request message carries a bearer identifier. The sending unit is further configured to send a modify bearer response message to the SGW-C if the apparatus does not include the context information of the bearer corresponding to the bearer identifier, where the modify bearer response message carries the bearer identifier and indication information that is used to indicate that the apparatus does not include the context information, and the modify bearer response message is used by the SGW-C to obtain the context information of the bearer according to the bearer identifier. The receiving unit is further configured to receive the reestablish bearer context message sent by the SGW-C, where the reestablish bearer context message carries the context information of the bearer.

In the first possible implementation of the third aspect, in a service request procedure, if the SGW-U does not include the context information of the bearer corresponding to the bearer identifier carried in the modify bearer request message, the SGW-U sends a message to the SGW-C to request to recover the context information in the SGW-U. This ensures that a data packet can be sent according to the context information when the data packet is received, and prevents user service interruption.

According to a fourth aspect, a data packet sending apparatus is provided. The apparatus includes a receiving unit, configured to receive a trigger message sent by a serving gateway for user plane (SGW-U). The trigger message carries a tunnel endpoint identifier (TEID). The trigger message is sent after the SGW-U receives a data packet carrying the TEID and determines, through matching, that the SGW-U does not include context information of a bearer corresponding to the TEID. The apparatus also includes a processing unit, configured to obtain the context information of the bearer according to the TEID. The apparatus also includes a sending unit, configured to send a reestablish bearer context message to the SGW-U, where the reestablish bearer context message carries the context information, and the reestablish bearer context message is used by the SGW-U to send the data packet according to the context information.

In the fourth aspect, the SGW-C sends the context information of the bearer to the SGW-U when the SGW-U determines, through matching, that the SGW-U does not include the context information of the bearer corresponding to the TEID, so that the SGW-U can send the data packet according to the context information. This prevents user service interruption and improves user experience.

With reference to the fourth aspect, in a first possible implementation of the fourth aspect, the processing unit is configured to: start timing when the trigger message is received; if a modify bearer request message sent by a mobility management entity MME is received before a timing time reaches a preset time, and the modify bearer request message carries a TEID that is of a first tunnel between a base station and the SGW-U and that is on a base station side and carries an address of the base station, update the TEID on the base station side and the address of the base station to the context information that is of the bearer corresponding to the TEID and that is stored on the apparatus; and obtain the updated context information of the bearer from stored context information according to the TEID.

In the first possible implementation of the fourth aspect, in a service request procedure, the SGW-C sends the context information to the SGW-U if the SGW-U does not include the context information of the bearer corresponding to a bearer identifier carried in the modify bearer request message. This ensures that the SGW-U can send a data packet according to the context information when receiving the data packet, and prevents user service interruption.

With reference to the first possible implementation of the fourth aspect, in a second possible implementation of the fourth aspect, the processing unit is configured to: if the modify bearer request message sent by the MME is not received when the timing time reaches the preset time, obtain the context information of the bearer from the stored context information according to the TEID.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

FIG. 4-1 is a flowchart of a data packet sending method according to an embodiment of the present disclosure;

FIG. 4-2 is a flowchart of another data packet sending method according to an embodiment of the present disclosure;

FIG. 4-3 is a flowchart of a service request procedure according to an embodiment of the present disclosure;

FIG. 4-4 is a flowchart of another service request procedure according to an embodiment of the present disclosure;

DETAILED DESCRIPTION OF ILLUSTRATIVE EMBODIMENTS

Figure 1:
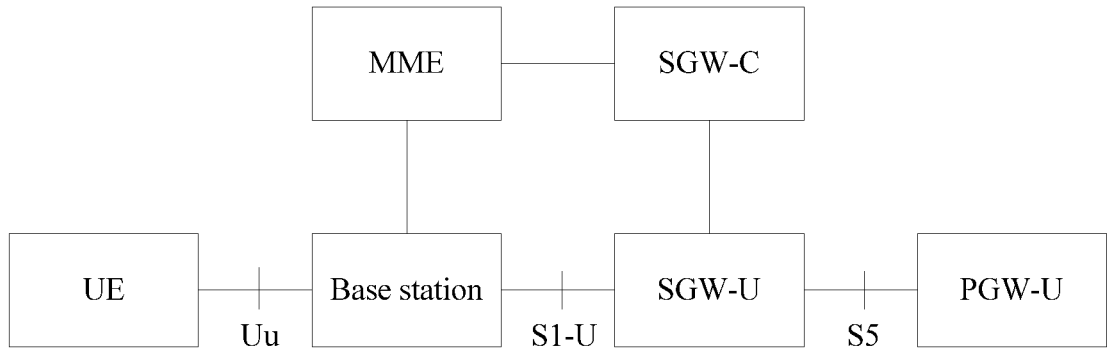
FIG. 1 is a diagram of a DGW logical network architecture according to an embodiment of the present disclosure.

To make the objectives, technical solutions, and advantages of the present disclosure clearer, the following further describes the embodiments of the present disclosure in detail with reference to the accompanying drawings.

The present disclosure is applied to a DGW network architecture. Referring to a DGW network architecture shown in FIG. 1, an SGW in the DGW network architecture is divided into two independent logical network elements: an SGW-C and an SGW-U. The SGW-C is a signaling control anchor of a neighboring network element, and is responsible for processing signaling of the neighboring network element. The SGW-C may be deployed in a centralized manner, and may be deployed at a relatively high position. For example, the SGW-C is deployed at a province center. The SGW-U is a processing anchor of a user data packet, and is responsible for receiving a user data packet and sending a user data packet. The SGW-U may be deployed in a distributed manner, and is closer to a user. For example, the SGW-U is deployed near a base station.

A bearer for transmitting a data packet is established on the SGW-U. The bearer includes a first tunnel between a base station and the SGW-U and a second tunnel between the SGW-U and a packet data gateway for user plane (PGW-U) among the base station, the SGW-U, and the PGW-U. For the first tunnel, two TEIDs are respectively used to identify two ends of the first tunnel. On a base station side, one TEID is used to identify one end that is of the first tunnel and that is on the base station side. On an SGW-U side, the other TEID is used to identify the other end that is of the first tunnel and that is on the SGW-U side. For the second tunnel, two TEIDs are respectively used to identify two ends of the second tunnel. On the SGW-U side, one TEID is used to identify one end that is of the second tunnel and that is on the SGW-U side. On a PGW-U side, the other TEID is used to identify the other end that is of the tunnel and that is on the PGW-U side.

The SGW-U includes context information of each bearer, the SGW-C includes context information of each bearer on each SGW-U, and the context information of each bearer on the SGW-U is configured by the SGW-C. For each bearer on the SGW-U, the context information of the bearer may be used to identify the bearer. The context information may include a bearer identifier of the bearer, the TEID that is of the first tunnel and that is on the base station side, an address of the base station, the TEID that is of the first tunnel and that is on the SGW-U side, an address of the SGW-U, the TEID that is of the second tunnel and that is on the SGW-U side, the TEID that is of the second tunnel and that is on the PGW-U side, and an address of the PGW-U.

The SGW-U may receive an uplink data packet sent by the base station, and a header of the uplink data packet sent by the base station includes information such as the TEID that is of the first tunnel and that is on the SGW-U side. After receiving the uplink data packet, the SGW-U obtains, according to the TEID carried in the uplink data packet, context information of a bearer corresponding to the TEID, and sends the uplink data packet to the PGW-U according to the TEID that is of the second tunnel and that is on the PGW-U side and the address of the PGW-U that are included in the context information.

The SGW-U may receive a downlink data packet sent by the PGW-U, and a header of the downlink data packet sent by the PGW-U includes information such as the TEID that is of the second tunnel and that is on the SGW-U side. After receiving the downlink data packet, the SGW-U obtains, according to the TEID carried in the downlink data packet, context information of a bearer corresponding to the TEID, and sends the downlink data packet to the base station according to the TEID that is of the first tunnel and that is on the base station side and the address of the base station that are included in the context information.

It should be noted that, the SGW-U sometimes loses context information, and consequently, when receiving the uplink data packet sent by the base station or the downlink data packet sent by the PGW-U, the SGW-U cannot obtain the lost context information according to the TEID on the SGW-U side that is carried in the uplink data packet or the TEID on the SGW-U side that is carried in the downlink data packet. In this case, the SGW-U may recover the lost context information in the SGW-U using the SGW-C, and send the uplink data packet or the downlink data packet using the recovered context information. A specific process in which the SGW-U recovers the context information by using the SGW-C and sends the uplink data packet or the downlink data packet is described in a subsequent embodiment. Details are not described herein.

Figure 2:
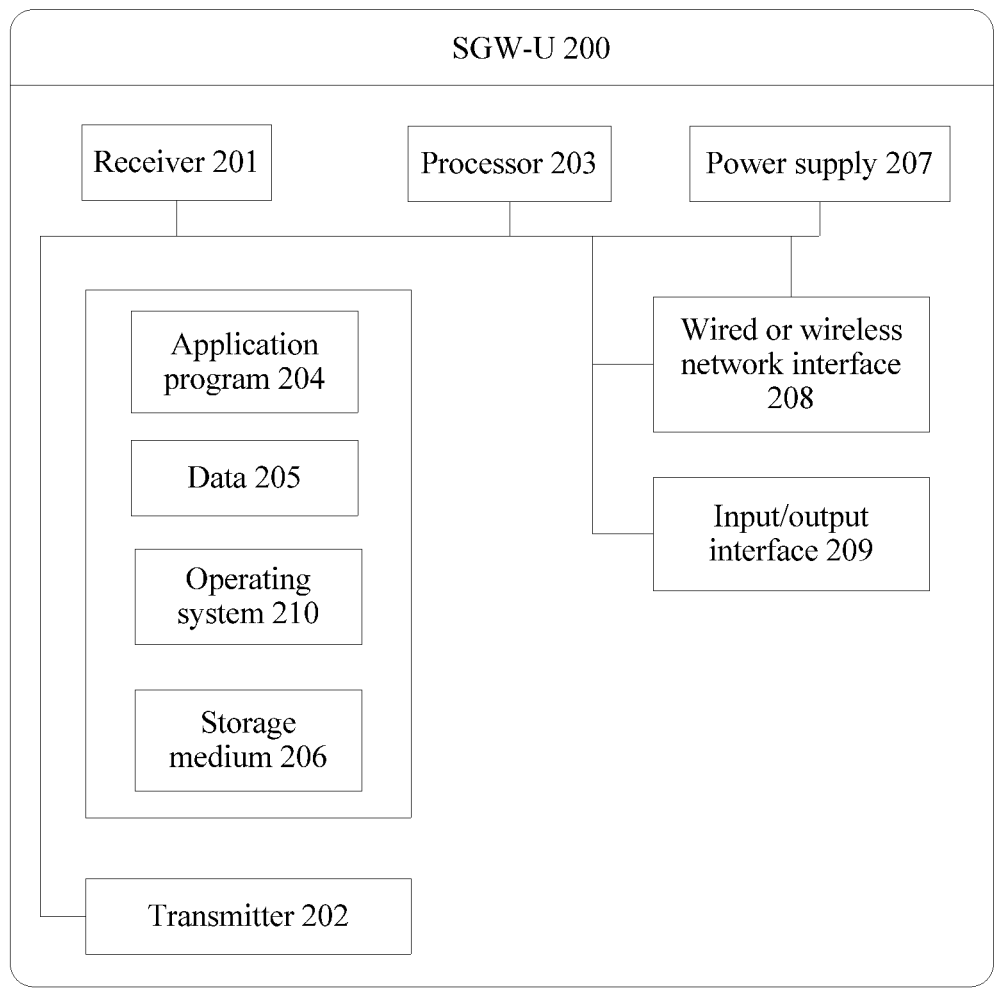
FIG. 2 is a structural block diagram of an SGW-U according to an embodiment of the present disclosure.

FIG. 2 is a structural block diagram of an SGW-U 200 according to an embodiment of the present disclosure. The SGW-U 200 may greatly vary due to different configurations or different performance, and may include one or more receivers 201, transmitters 202, and processors 203, and one or more storage media 206 (for example, one or more mass storage devices) for storing application programs 204 or data 205. The storage medium 206 may be a transient storage or a persistent storage. A program stored in the storage medium 206 may include one or more modules (which are not shown in the diagram), and each module may include a series of instruction operations. Furthermore, the processor 203 may be configured to: communicate with the storage medium 206, and perform, on the SGW-U 200, a series of instruction operations in the storage medium 206.

The SGW-U 200 may further include one or more power supplies 207, one or more wired or wireless network interfaces 208, one or more input/output interfaces 209, and/or one or more operating systems 210, such as Windows Server™, Mac OS X™, Unix™, Linux™, or FreeBSD™.

In the present disclosure, the receiver 201 and the transmitter 202 of the SGW-U 200 have the following functions.

The receiver 201 is configured to receive a data packet, and match context information of a corresponding bearer according to a TEID carried in the data packet.

The transmitter 202 is configured to send a trigger message to an SGW-C if the SGW-U 200 determines, through matching, that the SGW-U 200 does not include the context information of the bearer. The trigger message carries the TEID, and the trigger message is used by the SGW-C to obtain the context information of the bearer according to the TEID.

The receiver 201 is further configured to receive a reestablish bearer context message sent by the SGW-C. The reestablish bearer context message carries the context information of the bearer.

The transmitter 202 is further configured to send the data packet according to the context information of the bearer.

Optionally, the receiver is further configured to receive a modify bearer request message sent by the SGW-C. The modify bearer request message carries a bearer identifier.

The transmitter is further configured to send a modify bearer response message to the SGW-C if the SGW-U 200 does not include the context information of the bearer corresponding to the bearer identifier. The modify bearer response message carries the bearer identifier and indication information that is used to indicate that the SGW-U 200 does not include the context information, and the modify bearer response message is used by the SGW-C to obtain the context information of the bearer according to the bearer identifier.

The receiver is further configured to receive the reestablish bearer context message sent by the SGW-C. The reestablish bearer context message carries the context information of the bearer.

In this embodiment of the present disclosure, when determining, through matching, that the SGW-U does not include the context information of the bearer corresponding to the TEID, the SGW-U sends the trigger message to the SGW-C, to request to obtain the context information of the bearer, so that the SGW-U can send the data packet according to the obtained context information. This prevents user service interruption and improves user experience.

Figure 3:
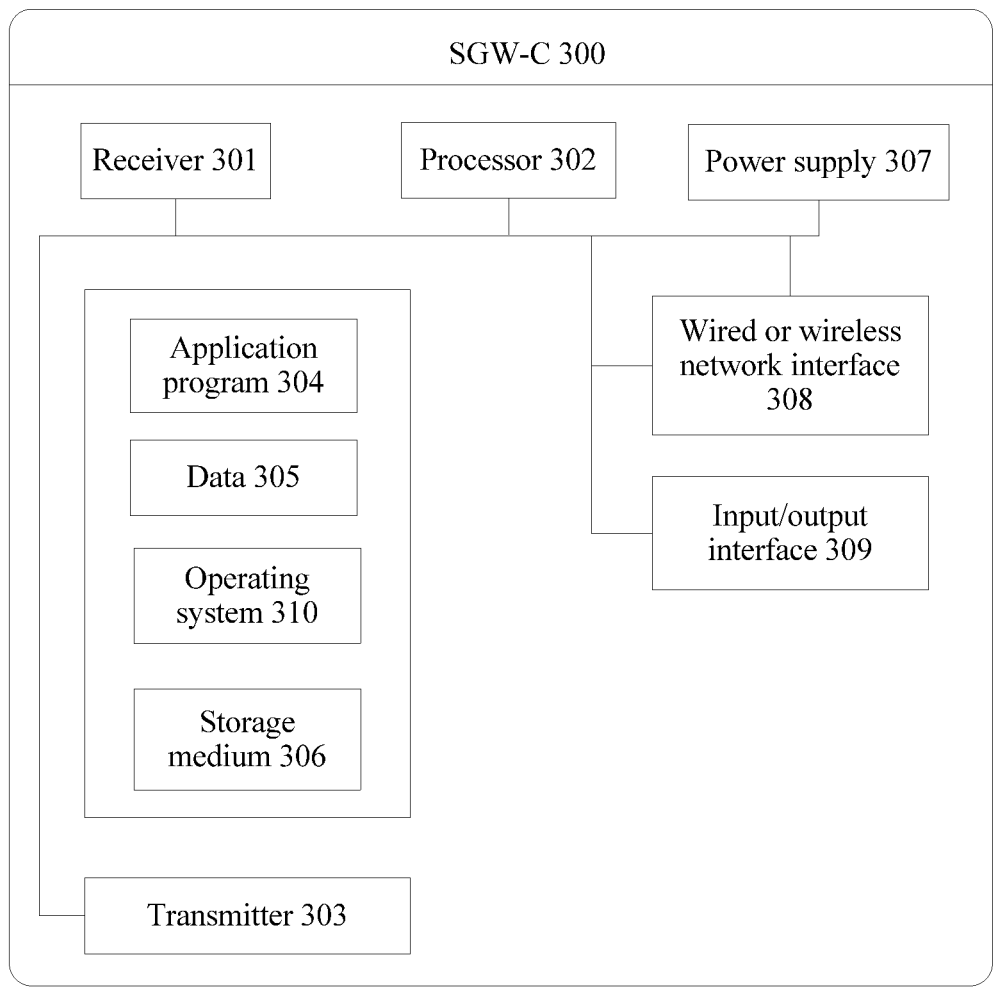
FIG. 3 is a structural block diagram of an SGW-C according to an embodiment of the present disclosure.

FIG. 3 is a structural block diagram of an SGW-C 300 according to an embodiment of the present disclosure. The SGW-C 300 may greatly vary due to different configurations or different performance, and may include one or more receivers 301, processors 302, and transmitters 303, and one or more storage media 306 (for example, one or more mass storage devices) for storing application programs 304 or data 305. The storage medium 306 may be a transient storage or a persistent storage. A program stored in the storage medium 306 may include one or more modules (which are not shown in the diagram), and each module may include a series of instruction operations. Furthermore, the processor 302 may be configured to: communicate with the storage medium 306, and perform, on the SGW-C 300, a series of instruction operations in the storage medium 306.

The SGW-C 300 may further include one or more power supplies 307, one or more wired or wireless network interfaces 308, one or more input/output interfaces 309, and/or one or more operating systems 210, such as Windows Server™, Mac OS X™, Unix™, Linux™, or FreeBSD™.

In the present disclosure, the receiver 301, the processor 302, and the transmitter 303 of the SGW-C 300 have the following functions.

The receiving unit 301 is configured to receive a trigger message sent by an SGW-U. The trigger message carries a TEID, and the trigger message is sent after the SGW-U receives a data packet carrying the TEID and determines that the SGW-U does not include context information of a bearer corresponding to the TEID.

The processing unit 302 is configured to obtain the context information of the bearer according to the TEID.

The sending unit 303 is configured to send a reestablish bearer context message to the SGW-U. The reestablish bearer context message carries the context information, and the reestablish bearer context message is used by the SGW-U to send the data packet according to the context information.

Optionally, the processor 302 is configured to: start timing when the trigger message is received; if a modify bearer request message sent by an MME is received before a timing time reaches a preset time, and the modify bearer request message carries a TEID that is of a first tunnel between a base station and the SGW-U and that is on a base station side and carries an address of the base station, update the TEID on the base station side and the address of the base station to the context information that is of the bearer corresponding to the TEID and that is stored on the SGW-C 300; and obtain the updated context information of the bearer from stored context information according to the TEID.

Optionally, the processor is configured to: if the modify bearer request message sent by the MME is not received when the timing time reaches the preset time, obtain the updated context information of the bearer from the stored context information according to the TEID.

In this embodiment of the present disclosure, the SGW-C sends the context information of the bearer to the SGW-U when the SGW-U determines, through matching, that the SGW-U does not include the context information of the bearer corresponding to the TEID, so that the SGW-U can send the data packet according to the context information. This prevents user service interruption and improves user experience.

Embodiment 4

Figures 1, 4:
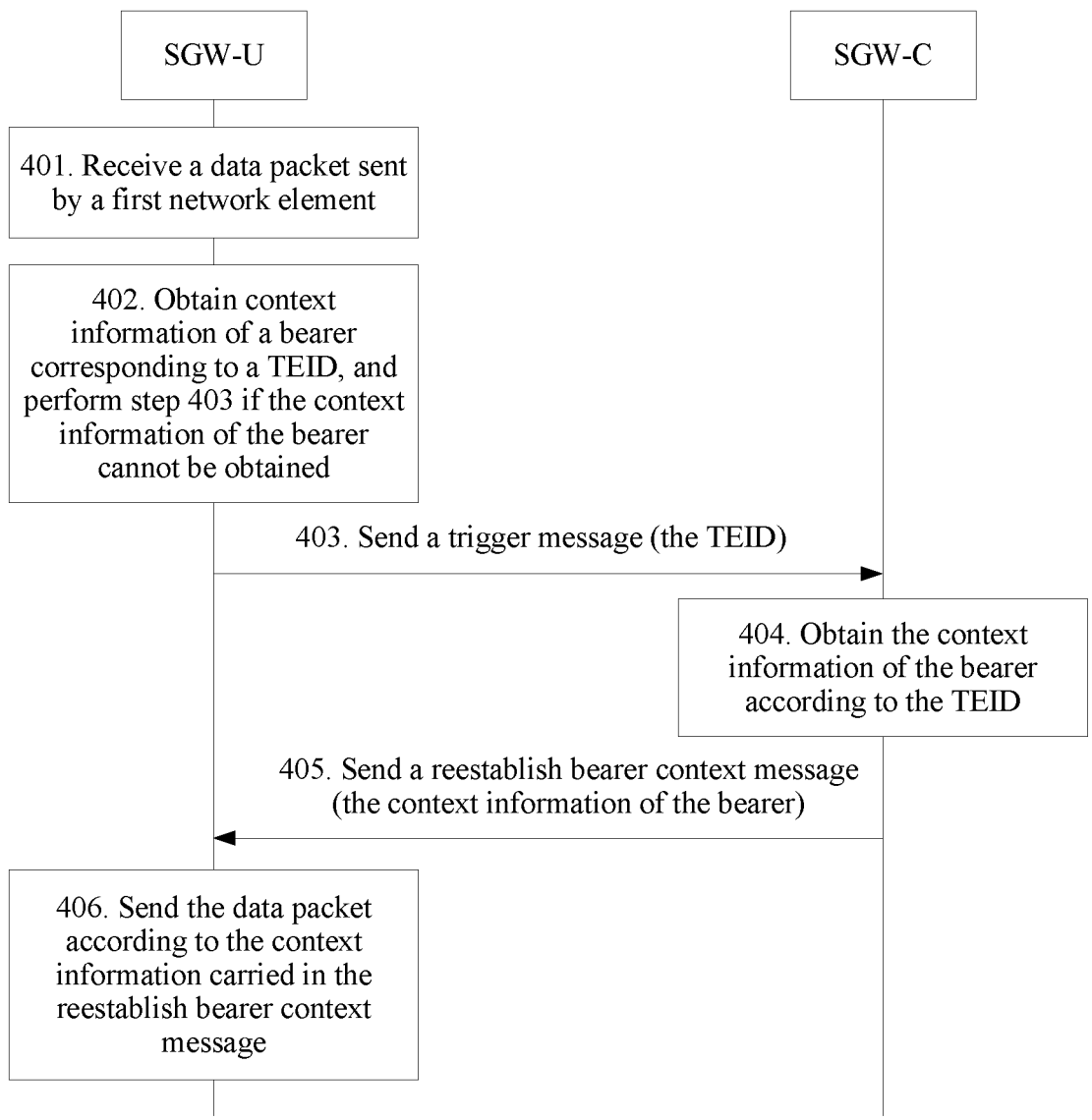
Figures 2, 4:
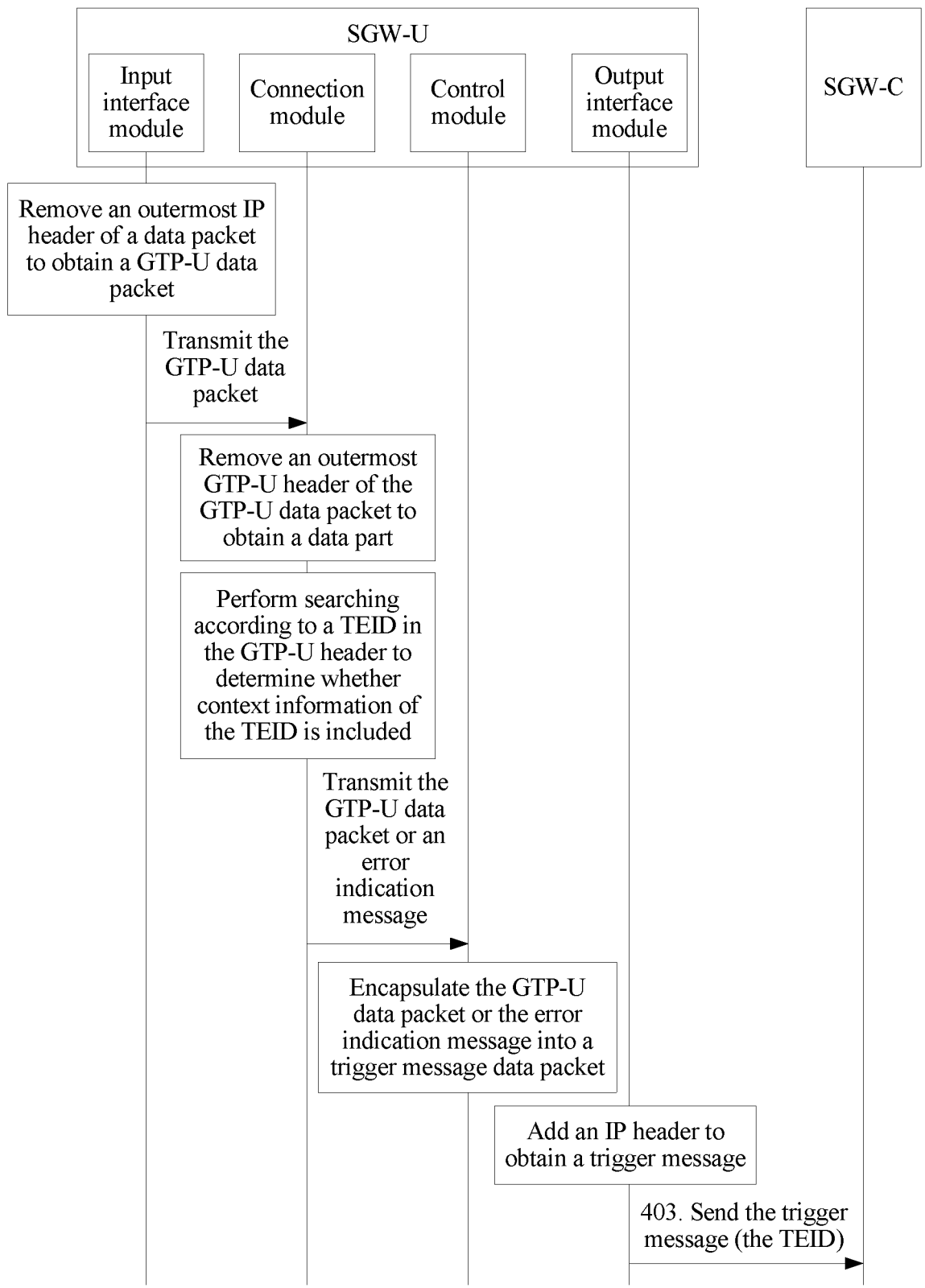
Figures 3, 4:
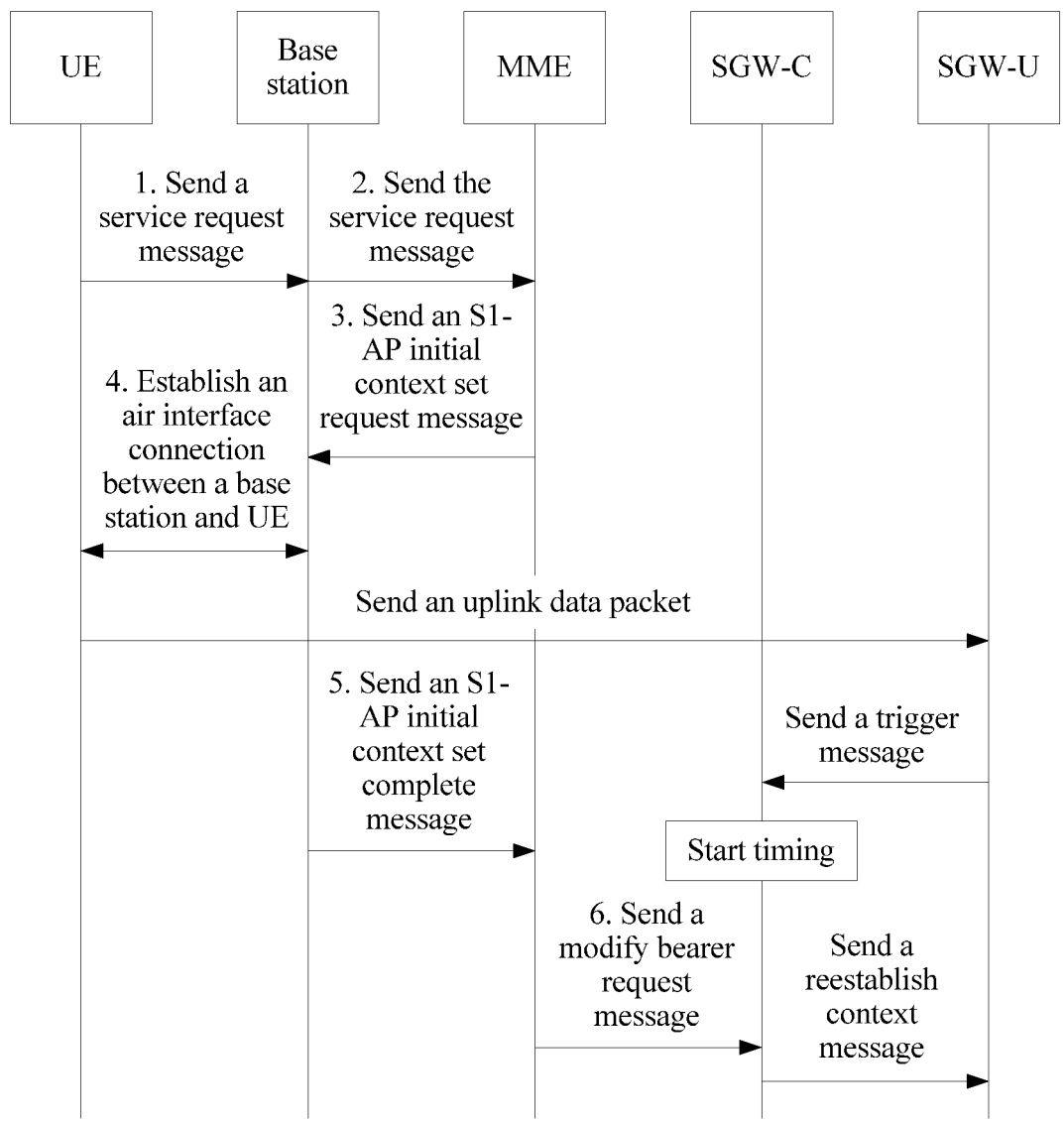
Figure 4:
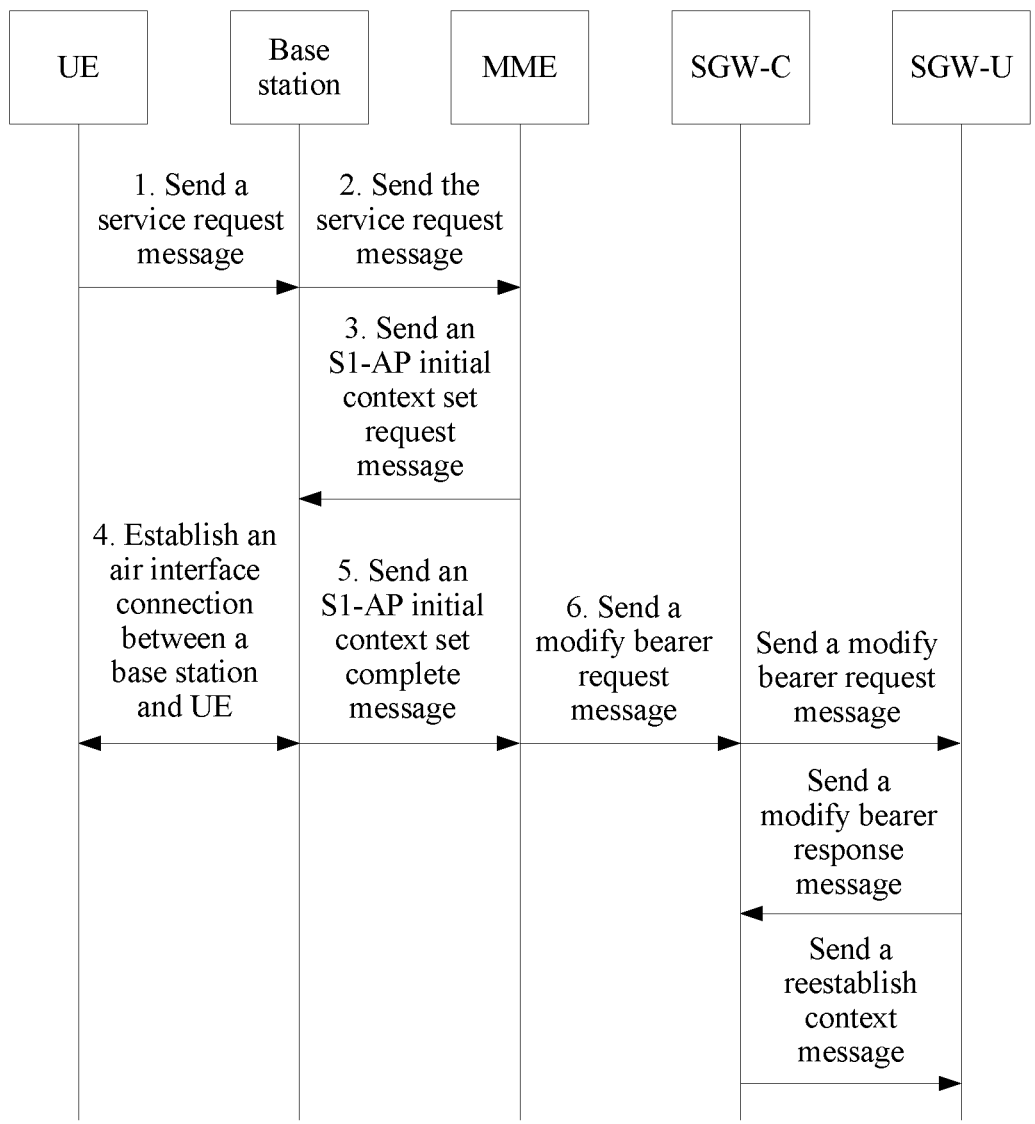

Referring to FIG. 4-1, an embodiment of the present disclosure provides a data packet sending method, and the method includes the following steps.

Step 401: An SGW-U receives a data packet sent by a first network element, where the data packet carries a TEID that is of a tunnel and that is on an SGW-U side, and the tunnel is used to transmit the data packet and is located in a bearer corresponding to the TEID.

The data packet may be an uplink data packet sent by a base station or a downlink data packet sent by a PGW-U. For the uplink data packet, the base station sends the uplink data packet on a first tunnel between the base station and the SGW-U, and a header of the uplink data packet includes a TEID that is of the first tunnel and that is on the SGW-U side. For the downlink data packet, the PGW-U sends the downlink data packet on a second tunnel between the PGW-U and the SGW-U, and a header of the downlink data packet includes a TEID that is of the second tunnel and that is on the SGW-U side.

The header of the uplink data packet or the header of the downlink data packet may further carry other information, for example, an address of the SGW-U.

Step 402: The SGW-U obtains, according to the TEID, context information of the bearer corresponding to the TEID, and performs step 403 if the SGW-U cannot obtain the context information of the bearer.

In an embodiment, the SGW-U searches, according to the TEID, context information of various bearers that is stored on the SGW-U, to determine whether context information of the TEID is included. If the context information is included, the SGW-U obtains the context information. The context information is the context information of the bearer corresponding to the TEID. If the context information of the TEID is not included, the SGW-U cannot obtain the context information of the bearer.

If the context information of the bearer is obtained, the SGW-U sends the data packet according to the obtained context information. In an embodiment, if the data packet is an uplink data packet, the SGW-U sends the uplink data packet to the PGW-U according to the TEID that is of the second tunnel and that is on the PGW-U side and an address of the PGW-U that are included in the context information. If the data packet is a downlink data packet, the SGW-U sends the downlink data packet to the base station according to the TEID that is of the first tunnel and that is on the base station side and an address of the base station that are included in the context information.

Step 403: The SGW-U sends a trigger message to an SGW-C, where the trigger message carries the TEID on the SGW-U side.

If the SGW-U cannot obtain the context information of the bearer, the SGW-U may lose the context information of the bearer. Because the context information of the various bearers that is on the SGW-U is configured by the SGW-C, the SGW-C includes the lost context information of the bearer. The SGW-U sends the trigger message to the SGW-C, to request to recover the lost context information of the bearer.

The SGW-U may be implemented in an object-oriented manner, and the SGW-U includes object-oriented modules such as an input interface module, a connection module, a control module, and an output interface module. The SGW-U may perform steps 401 to 403 by using these object-oriented modules. Specific implementation is as follows.

Referring to FIG. 4-2, the input interface module receives the data packet, removes an outermost IP header of the data packet to obtain a GTP-U data packet, matches the corresponding connection module according to the address of the SGW-U that is included in the IP header, and then outputs the GTP-U data packet to the connection module. The connection module removes an outermost GTP-U header of the GTP-U data packet to obtain a data part, and searches, according to the TEID on the SGW-U side that is included in the GTP-U header, the context information of the various bearers that is stored on the SGW-U, to determine whether the context information of the TEID is included. If the context information of the TEID is not included, the SGW-U cannot obtain the context information of the bearer. The connection module performs a GTP header encapsulation operation to re-add the removed GTP-U header to the data part, to generate the GTP-U data packet or construct an error indication message, where the error indication message includes the TEID information in the original GTP-U header; and transmits the GTP-U data packet or the error indication message to the control module. The control module receives the GTP-U data packet or the error indication message, encapsulates the GTP-U data packet or the error indication message into a trigger message data packet, and transmits the trigger message data packet to the output interface module. The output interface module receives the trigger message data packet; adds an IP header to the trigger message data packet to obtain the trigger message, where the IP header includes the address of the SGW-U and an address of the SGW-C; and sends the trigger message to the SGW-C. Optionally, referring to the following Table 1, a structure of the trigger message is shown in Table 1.

TABLE 1

| Key information element | Description |
| --- | --- |
| TEID | TEID of a user plane bearer |

Step 404: The SGW-C receives the trigger message, and obtains the context information of the bearer according to the TEID carried in the trigger message.

In an embodiment, the SGW-C receives the trigger message, searches, according to the TEID carried in the trigger message, context information stored on the SGW-C, determines that the context information of the TEID is included, and obtains the found context information, where the context information is the context information of the bearer.

Optionally, the context information of the bearer may include a bearer identifier of the bearer, the TEID that is of the first tunnel and that is on the base station side, the address of the base station, the TEID that is of the first tunnel and that is on the SGW-U side, the address of the SGW-U, the TEID that is of the second tunnel and that is on the SGW-U side, the TEID that is of the second tunnel and that is on the PGW-U side, and the address of the PGW-U. The first tunnel and the second tunnel are tunnels in the bearer.

Step 405: The SGW-C sends a reestablish bearer context message to the SGW-U, where the reestablish bearer context message carries the context information of the bearer.

Optionally, referring to Table 2, a structure of the reestablish bearer context message is shown in Table 2. A TEID and an address of a local S1 interface may be the TEID that is of the first tunnel and that is on the base station side and the address of the base station. A TEID and an address of a remote S1 interface may be the TEID that is of the first tunnel and that is on the SGW-U side and the address of the SGW-U. A TEID and an address of a local S5 interface may be the TEID that is of the second tunnel and that is on the SGW-U side and the address of the SGW-U. A TEID and an address of a remote S5 interface may be the TEID that is of the second tunnel and that is on the PGW-U side and the address of the PGW-U.

TABLE 2

| Key information element | Description |
| --- | --- |
| Create | Operation type |
| EPS bearer ID | An ID of an EPS bearer |
| Local_S1_F-TEID | A TEID and an address of a local S1 interface |
| Remote_S1_F-TEID | A TEID and an address of a remote S1 interface |
| Local_S5_F-TEID | A TEID and an address of a local S5 interface |
| Remote_S5_F-TEID | A TEID and an address of a remote S5 interface |

It should be noted that UE may be in an idle state. Therefore, when the UE is in an idle state, the first tunnel between the base station and the SGW-U is released, and the context information of the bearer that is stored on the SGW-C is incomplete. The context information of the bearer does not include the TEID that is of the first tunnel and that is on the base station side and does not include the address of the base station, but includes the TEID that is of the second tunnel and that is on the SGW-U side, the address of the SGW-U, the TEID that is of the second tunnel and that is on the PGW-U side, and the address of the PGW-U.

When the UE is switched from an idle state to a connected state, the UE restores the first tunnel using a service request procedure, and the context information of the bearer is recovered in the SGW-C. During a process of restoring the first tunnel, the SGW-U may receive an uplink data packet of the UE. If the SGW-U does not include the context information of the bearer, the SGW-U sends the trigger message to the SGW-C. If the SGW-C obtains the context information of the bearer immediately when receiving the trigger message, recovery of the context information of the bearer in the SGW-C may not be completed. As a result, the obtained context information of the bearer is incomplete. Therefore, the SGW-C starts timing first when receiving the trigger message. If recovery of the context information of the bearer is completed before a timing time reaches a preset time, the SGW-C obtains the recovered context information of the bearer. If the context information of the bearer is not recovered when the timing time reaches the preset time, the SGW-C obtains the context information of the bearer that is stored on the SGW-C.

Referring to FIG. 4-3, if the SGW-U receives an uplink data packet in the service request procedure, specific implementation is as follows: In a first step, the UE sends a service request message to the base station. In a second step, after receiving the service request message, the base station forwards the service request message to an MME. In a third step, after performing authorization and authentication, the MME sends an S1-AP initial context set request message to the base station, where the request message carries the TEID that is of the first tunnel and that is on the SGW-U side and the address of the SGW-U. In a fourth step, the base station receives the S1-AP initial context set request message, establishes an air interface connection between the base station and the UE, and sends an S1-AP initial context set complete message to the MME after completing establishment of the air interface connection, where the S1-AP initial context set complete message carries the TEID that is of the first tunnel and that is on the base station side and carries the address of the base station. In a fifth step, the MME receives the S1-AP initial context set complete message, and sends a modify bearer request message to the SGW-C, where the modify bearer request message carries the TEID that is of the first tunnel and that is on the base station side and carries the address of the base station. In a sixth step, the SGW-C receives the modify bearer request message, and stores the TEID that is of the first tunnel and that is on the base station side and the address of the base station into the context information of the bearer corresponding to the TEID. In this way, the context information of the bearer is recovered.

After completing establishment of the air interface connection between the UE and the base station, the UE may send an uplink data packet to the base station. The base station receives the uplink data packet and sends the uplink data packet to the SGW-U. The SGW-U receives the uplink data packet, and if the SGW-U cannot obtain, according to the TEID carried in the uplink data packet, the context information of the bearer corresponding to the TEID, the SGW-U sends the trigger message to the SGW-C.

Before receiving the modify bearer request message sent by the MME, the SGW-C may receive the trigger message sent by the SGW-U. If the SGW-C immediately obtains the context information of the bearer in this case, the SGW-C may obtain incomplete context information. Therefore, the SGW-C may start a timer when receiving the trigger message, to wait for arrival of the modify bearer request message sent by the MME, where the modify bearer request message carries the TEID that is of the first tunnel between the base station and the SGW-U and that is on the base station side and carries the address of the base station. If the SGW-C receives, before a timing time of the timer reaches a preset time, the modify bearer request message sent by the MME, the SGW-C adds the TEID that is of the first tunnel between the base station and the SGW-U and that is on the base station side and the address of the base station to the context information of the bearer corresponding to the TEID, obtains the context information of the corresponding bearer from stored context information according to the TEID carried in the trigger message, and sends the reestablish bearer context message to the SGW-U, where the reestablish bearer context message carries the context information of the bearer.

If the modify bearer request message sent by the MME is not received before the timing time of the timer reaches the preset time, the SGW-C obtains, according to the TEID carried in the trigger message, the context information of the bearer from the context information stored on the SGW-C, and sends the reestablish bearer context message to the SGW-U, where the reestablish bearer context message carries the context information of the bearer.

Step 406: The SGW-U receives the reestablish bearer context message, and sends the data packet according to the context information carried in the reestablish bearer context message.

In an embodiment, the SGW-U receives the reestablish bearer context message, and if the data packet is an uplink data packet, the SGW-U sends the uplink data packet to the PGW-U according to the TEID that is of the second tunnel and that is on the PGW-U side and the address of the PGW-U that are included in the context information; or if the data packet is a downlink data packet, the SGW-U sends the downlink data packet to the base station according to the TEID that is of the first tunnel and that is on the base station side and the address of the base station that are included in the context information.

Optionally, if the SGW-U does not receive an uplink data packet in the service request procedure, the context information of the bearer in the SGW-C may be recovered in the following manner:

Referring to FIG. 4-4, the UE initiates the service request procedure according to the first step to the sixth step, and the context information of the bearer is recovered in the SGW-C. Then, the SGW-C sends the modify bearer request message to the SGW-U, where the modify bearer request message carries the bearer identifier of the bearer. The SGW-U receives the modify bearer request message, and if the SGW-U determines, according to the bearer identifier carried in the modify bearer request message, that the SGW-U does not include the context information of the bearer, the SGW-U sends a modify bearer response message to the SGW-C, where the modify bearer response message carries the bearer identifier and a failure indication message, and the failure indication message indicates that the context information of the corresponding bearer cannot be found.

The SGW-C receives the modify bearer response message, and sends the reestablish bearer context message to the SGW-U, where the reestablish bearer context message carries the context information of the bearer corresponding to the bearer identifier.

In this embodiment of the present disclosure, when determining, through matching, that the SGW-U does not include the context information of the bearer corresponding to the TEID, the SGW-U sends the trigger message to the SGW-C, to request to obtain the context information of the bearer, so that the SGW-U can send the data packet according to the obtained context information. This prevents user service interruption and improves user experience.

Figure 5:
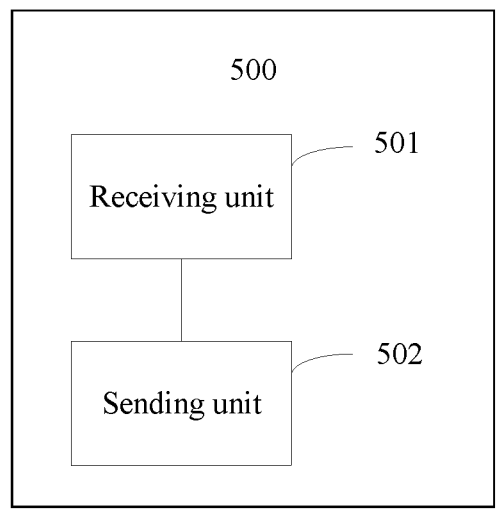
FIG. 5 is a schematic structural diagram of a data packet sending apparatus according to an embodiment of the present disclosure.

Referring to FIG. 5, an embodiment of the present disclosure provides a data packet sending apparatus 500. The apparatus includes a receiving unit 501, configured to: receive a data packet, and match context information of a corresponding bearer according to a TEID carried in the data packet. The apparatus also includes a sending unit 502, configured to send a trigger message to an SGW-C if the apparatus 500 determines, through matching, that the apparatus 500 does not include the context information of the bearer. The trigger message carries the TEID, and the trigger message is used by the SGW-C to obtain the context information of the bearer according to the TEID.

The receiving unit 501 is further configured to receive a reestablish bearer context message sent by the SGW-C. The reestablish bearer context message carries the context information of the bearer.

The sending unit 502 is further configured to send the data packet according to the context information of the bearer.

Optionally, the receiving unit 501 is further configured to receive a modify bearer request message sent by the SGW-C. The modify bearer request message carries a bearer identifier.

The sending unit 502 is further configured to send a modify bearer response message to the SGW-C if the apparatus does not include the context information of the bearer corresponding to the bearer identifier. The modify bearer response message carries the bearer identifier and indication information that is used to indicate that the apparatus does not include the context information, and the modify bearer response message is used by the SGW-C to obtain the context information of the bearer according to the bearer identifier.

The receiving unit 501 is further configured to receive the reestablish bearer context message sent by the SGW-C. The reestablish bearer context message carries the context information of the bearer.

In this embodiment of the present disclosure, when determining, through matching, that the SGW-U does not include the context information of the bearer corresponding to the TEID, the SGW-U sends the trigger message to the SGW-C, to request to obtain the context information of the bearer, so that the SGW-U can send the data packet according to the obtained context information. This prevents user service interruption and improves user experience.

Figure 6:
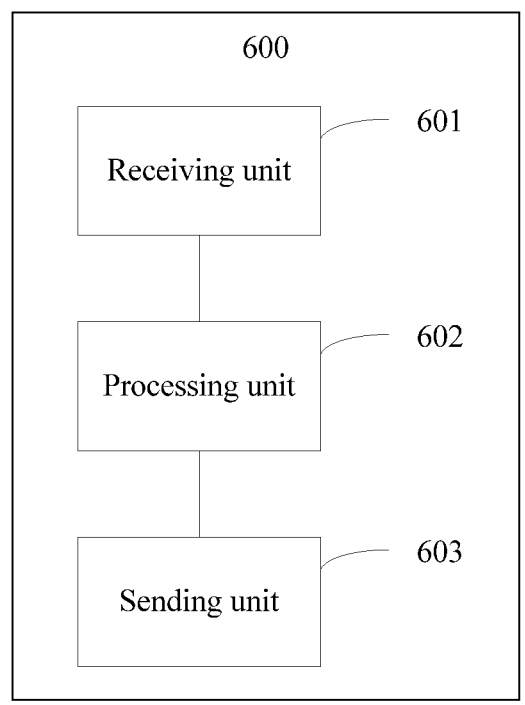
FIG. 6 is a schematic structural diagram of a data packet sending apparatus according to an embodiment of the present disclosure.

Referring to FIG. 6, an embodiment of the present disclosure provides a data packet sending apparatus 600. The apparatus includes: a receiving unit 601, configured to receive a trigger message sent by an SGW-U, where the trigger message carries a TEID, and the trigger message is sent after the SGW-U receives a data packet carrying the TEID and determines that the SGW-U does not include context information of a bearer corresponding to the TEID. The apparatus also includes a processing unit 602, configured to obtain the context information of the bearer according to the TEID. The apparatus also includes a sending unit 603, configured to send a reestablish bearer context message to the SGW-U, where the reestablish bearer context message carries the context information, and the reestablish bearer context message is used by the SGW-U to send the data packet according to the context information.

Optionally, the processing unit 602 is configured to: start timing when the trigger message is received; if a modify bearer request message sent by an MME is received before a timing time reaches a preset time, and the modify bearer request message carries a TEID that is of a first tunnel between a base station and the SGW-U and that is on a base station side and carries an address of the base station, update the TEID on the base station side and the address of the base station to the context information that is of the bearer corresponding to the TEID and that is stored on the apparatus 600; and obtain the updated context information of the bearer from stored context information according to the TEID.

Optionally, the processing unit 602 is configured to: if the modify bearer request message sent by the MME is not received when the timing time reaches the preset time, obtain the context information of the bearer from the stored context information according to the TEID.

Optionally, the receiving unit 601 is further configured to receive the modify bearer request message sent by the mobility management entity MME. The modify bearer request message carries the TEID that is of the first tunnel between the base station and the SGW-U and that is on the base station side and carries the address of the base station.

The sending unit 603 is further configured to send the reestablish bearer context message to the SGW-U, where the reestablish bearer context message carries the context information of the bearer.

Optionally, the sending unit 603 is further configured to send a modify bearer request message to the SGW-U. The modify bearer request message carries a bearer identifier, and the bearer identifier is used by the SGW-U to determine whether the SGW-U includes the context information of the bearer.

The receiving unit 601 is further configured to receive a modify bearer response message that is sent when the SGW-U determines that the context information of the bearer is not included.

In this embodiment of the present disclosure, the SGW-C sends the context information of the bearer to the SGW-U when the SGW-U determines, through matching, that the SGW-U does not include the context information of the bearer corresponding to the TEID, so that the SGW-U can send the data packet according to the context information. This prevents user service interruption and improves user experience.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely example embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A method, comprising:
receiving, by a serving gateway for user plane (SGW-U), a data packet comprising a tunnel endpoint identifier (TEID);
attempting to match, by the SGW-U, the TEID to context information of a bearer corresponding to the TEID;
in response to failing to match the TEID to context information of the bearer corresponding to the TEID, sending, by the SGW-U, the TEID to a serving gateway for control plane (SGW-C);
receiving, by the SGW-U, a reestablish bearer context message from the SGW-C, wherein the reestablish bearer context message carries the context information of the bearer; and
sending, by the SGW-U, the data packet according to the context information of the bearer.

2. The method according to claim 1, further comprising:
receiving a modify bearer request message from the SGW-C, wherein the modify bearer request message carries a bearer identifier; and
when the SGW-U does not comprise context information of a bearer corresponding to the bearer identifier, sending a modify bearer response message to the SGW-C, wherein the modify bearer response message carries the bearer identifier and indication information indicating that the SGW-U does not comprise the context information of the bearer corresponding to the bearer identifier; and
wherein receiving, by the SGW-U, the reestablish bearer context message from the SGW-C comprises receiving the reestablish bearer context message from the SGW-C, wherein the reestablish bearer context message carries the context information of the bearer corresponding to the bearer identifier.

3. The method according to claim 1, wherein the SGW-U sends the TEID to the SGW-C in a trigger message.

4. The method according to claim 1, wherein the SGW-U is logically decoupled from the SGW-C.

5. The method according to claim 1, wherein the bearer corresponding to the TEID is between the SGW-U and a packet data gateway for user plane (PGW-U).

6. The method according to claim 1, wherein the bearer corresponding to the TEID is between the SGW-U and a base station.

7. An apparatus, comprising:
a receiver, configured to receive a data packet comprising a tunnel endpoint identifier (TEID);
a processor;
a computer-readable storage medium storing a program to be executed by the processor, the program including instructions for:
attempting to match the TEID to context information of a bearer corresponding to the TEID; and
a transmitter, configured to:
in response to failing to match the TEID to context information of the bearer corresponding to the TEID, send a trigger message comprising the TEID to a serving gateway for control plane (SGW-C);
wherein the receiver is further configured to receive a reestablish bearer context message from the SGW-C, wherein the reestablish bearer context message carries the context information of the bearer corresponding to the TEID; and
wherein the transmitter is further configured to send the data packet according to the context information of the bearer corresponding to the TEID.

8. The apparatus according to claim 7, wherein the receiver is further configured to receive a modify bearer request message from the SGW-C, wherein the modify bearer request message carries a bearer identifier;
wherein the transmitter is further configured to:
when the apparatus does not comprise the context information of the bearer corresponding to the bearer identifier, send a modify bearer response message to the SGW-C, wherein the modify bearer response message carries the bearer identifier and indication information that indicates that the apparatus does not comprise the context information of the bearer corresponding to the bearer identifier; and
wherein the reestablish bearer context message carries the context information of the bearer corresponding to the bearer identifier.

9. The apparatus according to claim 7, wherein the SGW-C sends the TEID to the SGW-C in a trigger message.

10. The apparatus according to claim 7, wherein the bearer corresponding to the TEID is between the apparatus and a packet data gateway for user plane (PGW-U).

11. The apparatus according to claim 7, wherein the bearer corresponding to the TEID is between the apparatus and a base station.

12. An apparatus, comprising:
a receiver, configured to receive a tunnel endpoint identifier (TEID) from a serving gateway for user plane (SGW-U);
a processor, configured to obtain context information of a bearer corresponding to the TEID; and
a transmitter, configured to send a reestablish bearer context message to the SGW-U, wherein the reestablish bearer context message carries the context information, and the SGW-U uses the context information for data packet transmission.

13. The apparatus according to claim 12, wherein the TEID is received from the SGW-U in a trigger message.

14. The apparatus according to claim 8, wherein the processor is further configured to:
start a timer when the TEID is received;
when a modify bearer request message from a mobility management entity (MME) is received before the timer reaches a preset time, the modify bearer request message carries the TEID, the TEID corresponds to a first tunnel between a base station and the SGW-U, and the TEID identifies an end of the first tunnel that corresponds to the base station, and when the modify bearer request message further carries an address of the base station, store the TEID and the address of the base station into the context information of the bearer corresponding to the TEID, and obtain the context information of the bearer from stored context information according to the TEID.

15. The apparatus according to claim 14, wherein the processor is further configured to:
when the modify bearer request message from the MME is not received when the timing time reaches the preset time, obtain the context information of the bearer from the stored context information according to the TEID.

* * * * *